United States Patent [19]

Cavestany et al.

[11] Patent Number: 4,537,117
[45] Date of Patent: Aug. 27, 1985

[54] FRESH AIR DEVICE FOR MOBILE HOME OR OTHER DWELLING

[75] Inventors: Adrian V. Cavestany; Alan R. Zimmerman, both of Wichita, Kans.

[73] Assignee: The Coleman Company, Inc., Wichita, Kans.

[21] Appl. No.: 569,919

[22] Filed: Jan. 11, 1984

[51] Int. Cl.³ .............................. F24D 5/00; F24F 7/00
[52] U.S. Cl. .......................................... 98/39.1; 98/64; 237/46; 237/50
[58] Field of Search .................. 98/33 R, 39, 64, 116; 126/110 A, 110 AA; 237/46, 50, 53, 55

[56] References Cited

U.S. PATENT DOCUMENTS

| | | | |
|---|---|---|---|
| 1,508,813 | 9/1924 | Miles | 98/39 X |
| 1,973,623 | 9/1934 | Hanlon | 98/39 X |
| 1,997,181 | 4/1935 | Lyon | 98/39 |
| 2,039,948 | 5/1936 | Best | 126/110 A |
| 3,192,850 | 7/1965 | Martin | 237/50 X |
| 3,807,290 | 4/1974 | Eubank | 98/33 R |

FOREIGN PATENT DOCUMENTS 510980   8/1939   United Kingdom ................... 98/39

*Primary Examiner*—Harold Joyce

[57] ABSTRACT

A fresh air device is provided for a mobile home or other dwelling which has an attic and a furnace with an air blower for supplying conditioned air to the dwelling. The fresh air device includes a fresh air blower for supplying fresh, outside air to an air box within the attic, and an air dividing partition within the air box for diverting a first portion of the outside air to the attic and a second portion of the outside air to a duct, the duct being connected to the furnace.

21 Claims, 8 Drawing Figures

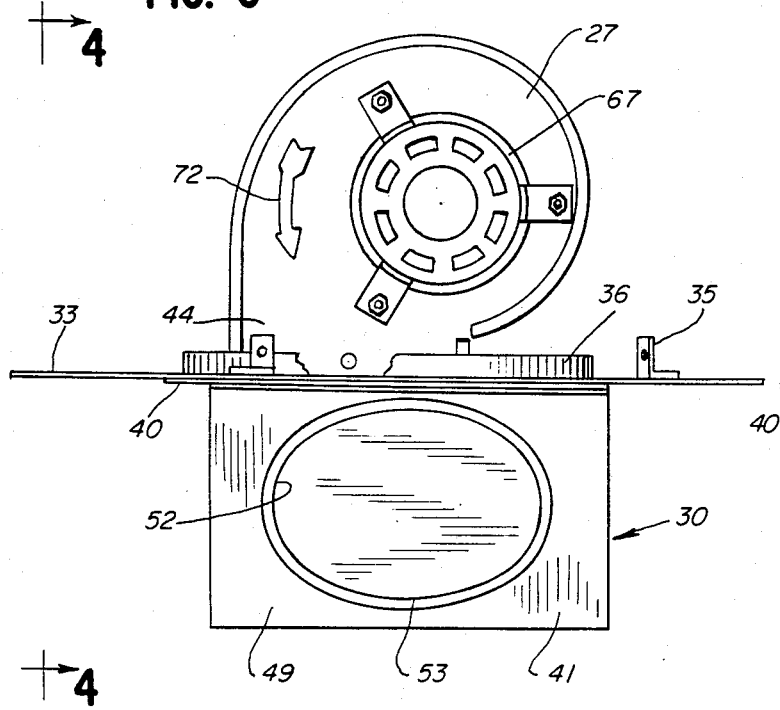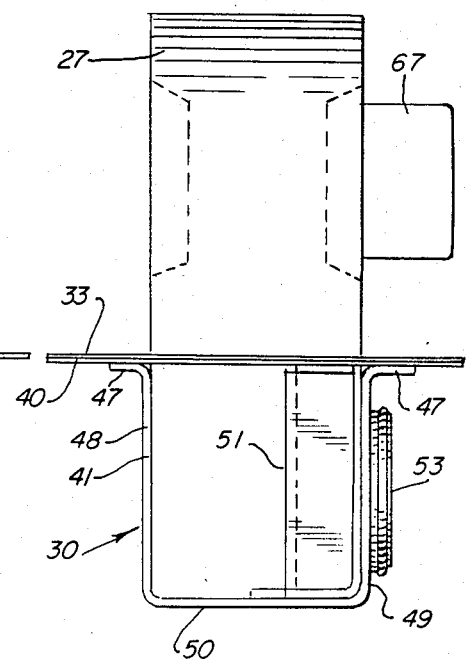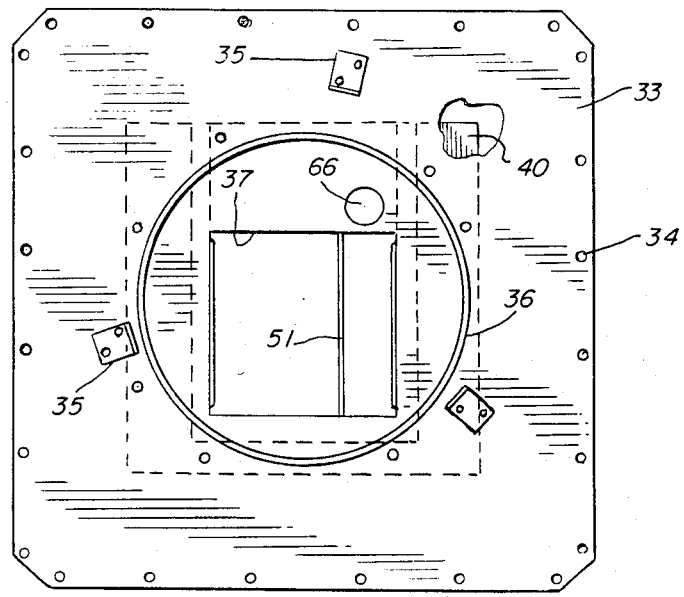

FRESH AIR DEVICE FOR MOBILE HOME OR OTHER DWELLING

BACKGROUND

This invention relates to a fresh air device for supplying fresh, outside air to the attic and to the furnace of a dwelling.

The invention finds particular utility in mobile homes, but the invention can also be used in other dwellings, such as conventional site-built homes. The specific embodiment will be described with respect to a mobile home, but it will be understood that the invention is not so limited.

Mobile homes, or manufactured housing, have suffered from three serious problems in recent years:

1. Mobile homes are tightly constructed, and odors tend to build up. Odors can emanate from construction materials, for example, adhesives, paints, paneling, etc., and from normal household activities and things, for example, cooking, smoking, pets, etc. Because of the tight construction and the vapor seal of mobile homes, these odors do not exfiltrate quickly or at the natural rate of most site-built dwellings.

2. Because of the tight construction of the mobile home and the vapor seal around the walls, floor, and ceiling, the interior surfaces tend to trap moisture during occupancy. Moisture can be created by cooking, bathing, etc. This excess moisture can condense on cold windows and walls, which can lead to damage to wood and carpets and to growth of mildew.

3. Most roof structures of most single-wide mobile homes are metal, and the attic cavity below the roof is generally unvented. Moisture generated in the living quarters tends to leak upward to the attic through leaks or tears in the ceiling vapor barrier, e.g., at electrical fixtures, plumbing vents, etc. This moisture becomes trapped in the attic space, accumulates to high levels, and condenses to water on the inner surface of the cold metal roof. As more and more liquid moisture accumulates, the liquid permeates the insulation and causes two serious problems: the moisture-soaked insulation loses its insulating value and the heat loss subsequently increases; and the moisture drips through the ceiling, causing spotting and staining and ultimately soaking the ceiling surface. Also, within months mold or mildew begins to grow.

SUMMARY OF THE INVENTION

The invention provides a single device that solves the foregoing problems by:

1. providing dry outside fresh air;
2. diluting the moisture-laden air in the occupied space;
3. concurrently pressurizing the attic to reduce migration of moisture to the attic. The invention accomplishes the foregoing without requiring doors and windows to be opened and without excessive energy loss.

As opposed to the prior art practice of exfiltrating air from the attic space, the invention utilizes a centrifugal blower assembly that draws air from the outside and simultaneously discharges the outside air into the attic space and into the living space. The centrifugal blower assembly is mounted on the roof flashing and is protected from the elements by a shroud assembly. Service access to the blower motor is from the roof by removing the shroud assembly.

The amount of air discharged into the attic space and into the living space is determined by the location of a divider plate in a plenum box below the blower. The preferred location diverts 30% to 40% of the blower capacity to the living space. In the range of 0.10 inch water column to 0.24 inch water column external static pressures generated by the furnace blower, the total air delivery provided by the roof blower is in the range of 116 to 155 cubic feet per minute. This air flow is divided between the living quarters and the attic. The air flow diverted to the living quarters is in the range of 35 to 62 cubic feet per minute, depending upon surface capacity and filter condition, and the attic receives air ranging from 81 to 93 cubic feet per minute.

The divider plate in the plenum box is located disproportionately closer to the furnace outlet side of the box because that side communicates with a negative pressure in the furnace blower compartment. The attic side of the plenum box is at neutral pressure with respect to the fresh air blower. Air is discharged into the attic space through the open ends of the plenum box. Air to the living space is discharged through an opening on the side of the plenum box to a flexible 5 inch diameter tube.

The flexible tube is routed through the attic space, through the ceiling, and attached to a damper assembly on the top casing of the furnace blower compartment. The electrical cable for the fresh air blower is routed alongside the flexible tube. The damper assembly has a measured weight on one side of the damper blade to keep it in the normally closed position. This prevents conditioned air from escaping to the outside through the flexible tube.

DESCRIPTION OF THE DRAWING

The invention will be explained in conjunction with an illustrative embodiment shown in the accompanying drawing, in which—

FIG. 3 is a side elevational view of the fresh air blower and air plenum box;

FIG. 4 is an elevational view of the fresh air blower and air plenum box taken along the line 4—4 of FIG. 3;

FIG. 5 is a top plan view of the roof mounting plate and the air plenum box;

DESCRIPTION OF SPECIFIC EMBODIMENT

Figure 1:
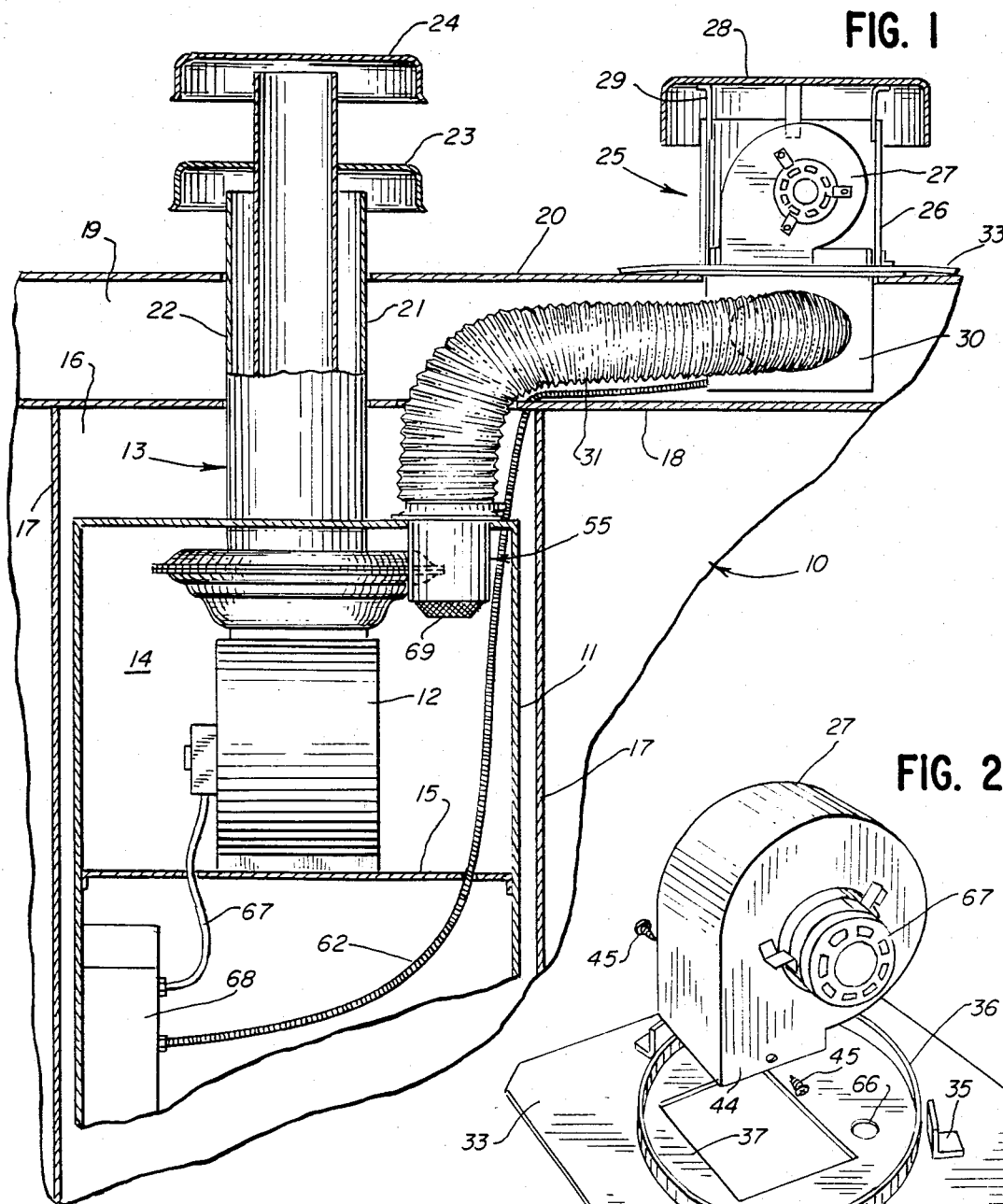
FIG. 1 is a fragmentary perspective view of a mobile home which includes a sealed combustion forced air furnace and which is equipped with a fresh air device in accordance with the invention.

Referring to FIG. 1, a mobile home 10 is equipped with a furnace 11. The furnace is a conventional forced air furnace which includes a centrifugal air blower 12 and a roof jack assembly 13. The air blower is mounted in a blower compartment or air intake chamber 14 in the furnace and forces air into a heat exchanger 15. The heated air from the heat exchanger is circulated to the rooms by air ducts. The furnace is conventional, and a detailed description of a typical forced air furnace is given in U.S. Pat. Nos. 3,614,949, 3,656,470, and 3,685,577. Although the invention will be described with reference to a forced air furnace, the invention can also be used with electric furnaces and heat pumps.

The furnace is advantageously enclosed within a closet 16 which is provided by walls or partitions 17. The roof jack assembly 13 extends upwardly from the combustion chamber through the ceiling 18 of the mobile home, through the attic space 19, and through the roof 20. The roof jack includes an outer combustion air inlet pipe 21 and an inner flue outlet pipe 22. The upper ends of the concentric pipes are protected by shrouds 23 and 24.

A fresh air inlet assembly 25 is mounted on the roof of the mobile home. The fresh air inlet assembly includes a fresh air inlet duct 26 which extends upwardly from the roof and a fresh air centrifugal blower 27 which is enclosed by the duct 26. A shroud 28 is mounted on the upper end of the duct by brackets 29 which space the shroud upwardly from the duct so that outside air can be drawn into the duct by the blower 27. An air plenum box 30 extends downwardly from the blower 27 through an opening in the roof and serves to divide the incoming outside air into two portions, one of which is diverted into the attic 19 and the other of which is diverted into a flexible tube 31.

Figure 2:
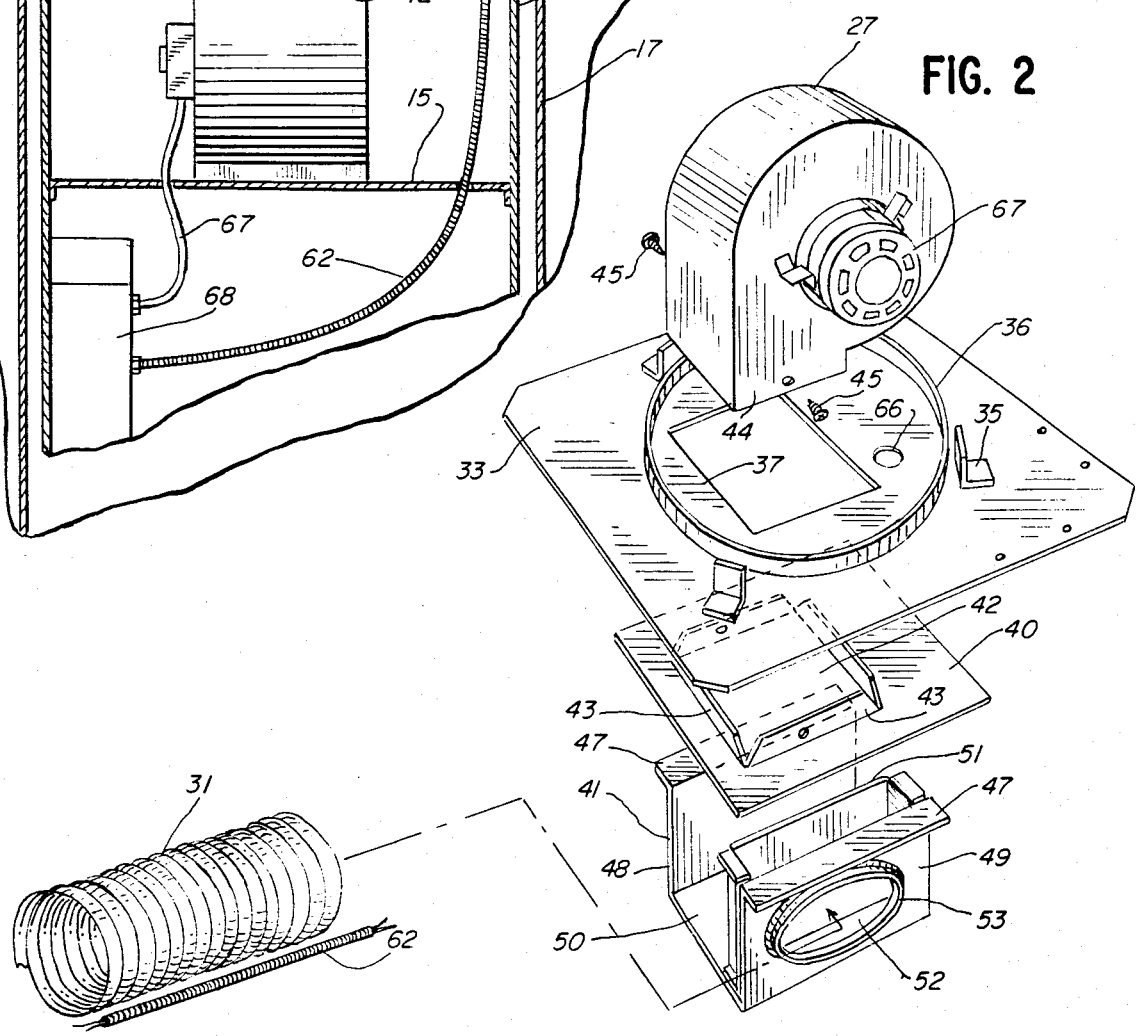
FIG. 2 is an exploded perspective view, partially broken away, of the fresh air device.

The details of the fresh air inlet assembly 25 are shown in FIG. 2. A generally rectangular roof mounting plate 33 is secured to the upper surface of the roof by sheet metal screws which extend through openings 34 (FIG. 5) in the mounting plate. The fresh air inlet duct 26 is removably attached to the roof mounting plate by screws which extend through the duct and through L-shaped brackets 35 on the mounting plate. A circular collar 36 is welded to the mounting plate inside the duct 26 and prevents rain from entering the rectangular air opening 37 in the mounting plate.

An air dividing or air plenum box assembly 30 (FIGS. 3 and 4) includes a top mounting plate 40 (FIG. 2) and a U-shaped air box 41. The top mounting plate 40 is provided with an air opening 42, and the edge portions of the top mounting plate 40 are turned upwardly around the opening 42 to provide four attaching flanges 43 which extend upwardly through the opening 37 in the roof mounting plate 33 when the top mounting plate 40 is secured to the roof mounting plate, as by welding. The outlet end 44 of the fresh air blower 27 fits over the four attaching flanges 43 and is secured by screws 45.

The upper ends of the U-shaped air box 41 are turned outwardly to provide attaching flanges 47 which are welded to the top mounting plate 40. The U-shaped air box includes a pair of side walls 48 and 49 and a bottom wall 50. A U-shaped divider plate is welded to the side wall 49 and to the bottom wall 50 of the air box.

An air outlet opening 52 is provided in the side wall 49 of the air box, and an attaching collar 53 surrounds the outlet opening. The flexible tube 31 is attached to the attaching collar 53. The flexible tube 31 can be a conventional accordion-pleated flexible tube which is formed from an outer flexible tube of, for example, metal foil and which is reinforced by axially spaced metal reinforcing rings. The flexible tube 31 extends through an opening in the ceiling 18 and is connected to a damper assembly 55 (FIG. 1) which is mounted in the top wall of the blower compartment 14 of the furnace.

Figure 6:
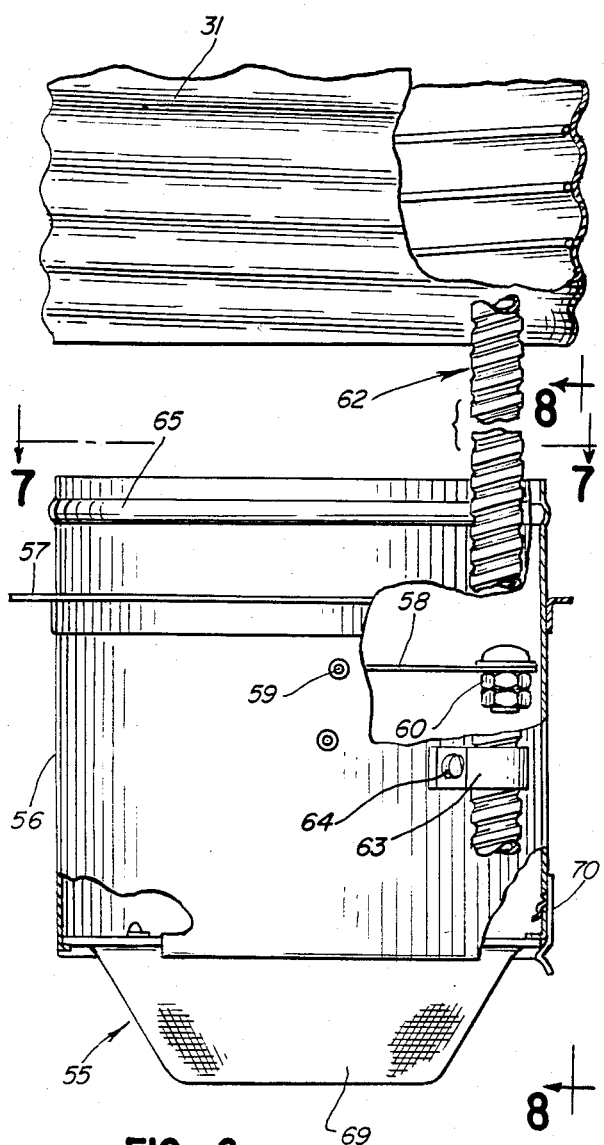
FIG. 6 is a fragmentary exploded view of the flexible tube and the damper assembly.
Figure 7:
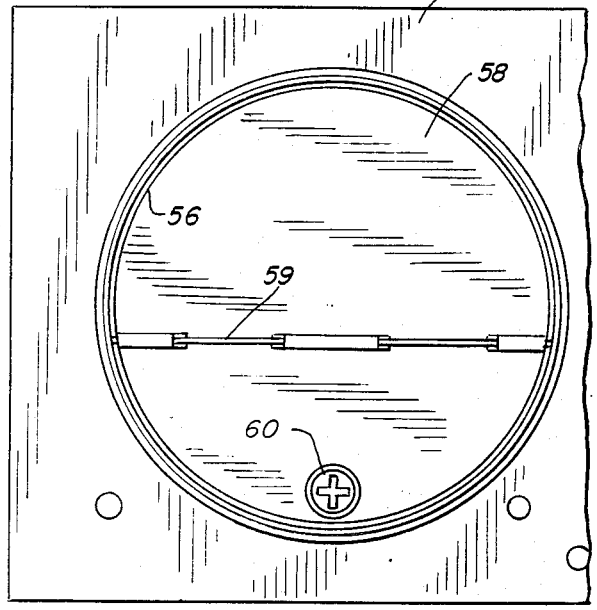
FIG. 7 is a top plan view of the damper assembly taken along the line 7—7 of FIG. 6.
Figure 8:
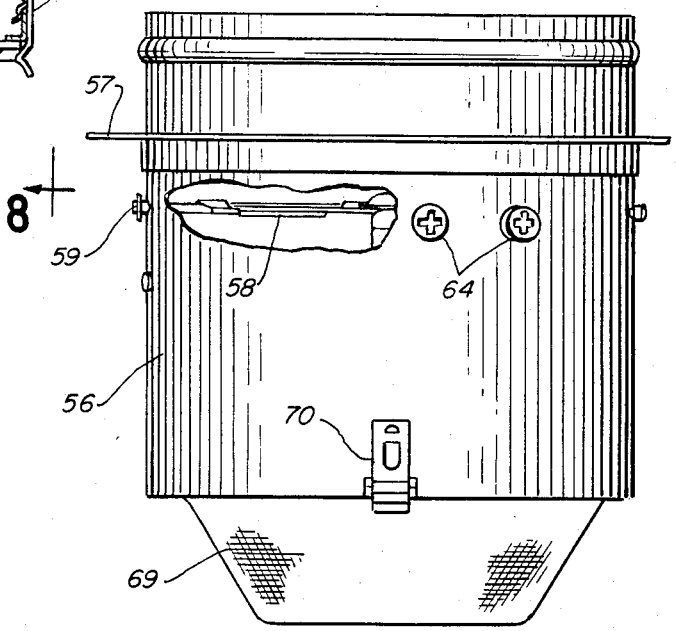
FIG. 8 is a side view of the damper assembly taken along the line 8—8 of FIG. 6.

Referring to FIGS. 6-8, the damper assembly 55 includes a cylindrical casing 56 and a mounting plate 57 which surrounds the casing 56 and is attached thereto. The mounting plate 57 is attached to the top wall of the blower compartment of the furnace. A circular damper blade 58 is pivotally mounted within the casing 56 by a pivot rod 59 which extends through the casing 56. The pivot rod 59 is mounted off-center with respect to the damper blade 58 and the casing 56 to divide the damper blade into a major portion and a minor portion, and a weight 60 is mounted on the minor portion of the damper blade to keep the damper blade normally closed. The weight 60 can conveniently be provided by a nut and bolt which are mounted on the damper blade.

An electric cable assembly 62 for supplying power to the fresh air blower 27 is mounted outside of the casing 56 of the damper assembly. The cable assembly 62 is channelled to the casing by a cable clamp 63 and screws 64, and the screws 64 provide a stop for preventing the weighted minor portion of the damper blade from pivoting beyond the closed position.

The lower end of the flexible tube 31 is connected to the top of the casing of the furnace. The casing 56 can be provided with an outwardly extending bead 65 to facilitate connecting the flexible tube to the casing by a suitable clamp (not shown) which can be positioned around the flexible tube below the bead.

The electric cable assembly 62 extends outside the flexible tube, through the air box 41, and through a cable opening 66 (FIG. 2) in the roof mounting plate for connection to the motor 67 of the fresh air blower 27. The upper end of the electric cable assembly has ¼ inch Q.C. for connection to the blower motor 67. The other end of the electric cable assembly extends through the furnace casing and has a "piggy back" ¼ inch Q.C. terminal and a stripped end for a parallel connection to the furnace blower leads 67 (FIG. 1) in the furnace junction box 68.

An air filter 69 (FIGS. 6 and 8) is removably connected to the bottom of the casing 56 of the damper assembly by attaching clips 70. In the embodiment illustrated the air filter 69 is formed from expanded metal screen.

Referring to FIGS. 3-5, the fresh air blower 27 draws fresh air from outside of the mobile home and delivers it in the direction of the arrow 72 in FIG. 3 through the outlet end 44 of the blower and through the opening 37 in the roof mounting plate 33. The air divider plate 51 divides the incoming outside air into two portions. One portion flows to the left of the divider plate 51 as viewed in FIG. 5 and flows through the open sides of the U-shaped air box 41 into the attic space. The other portion of the incoming air is diverted to the right of the air divider plate 51 as viewed in FIG. 5 and is confined by the U-shaped air divider plate so that it flows through the outlet opening 52 of the air box into the flexible tube 31. The portion of the outside air which flows through the flexible tube 31 flows through the damper assembly 55 into the blower compartment 14 of the furnace. This flow of outside air is assisted by the negative pressure created in the blower compartment by the furnace blower 12. The outside air which flows through the damper assembly 55 is mixed with conditioned air which is drawn into the blower compartment from the living quarters by the furnace blower 12. The mixture of conditioned air and outside fresh air is then circulated past the heat exchanger and distributed through the furnace ducts to the living quarters.

The amount of air which is discharged into the attic space and the amount of air which is discharged into the living space is determined by the location of the divider plate 51 in the air plenum box. As illustrated in FIG. 5, the divider plate 51 is located disproportionately closer to the furnace outlet opening 52 of the air box. More air is therefore delivered to the attic than to the furnace, and the position of the air divider plate 51 illustrated in FIG. 5 diverts about 30% to 40% of the outside air to the furnace. In the range of 0.10 inch of water to 0.24 inch of water external static pressures generated by the furnace blower 12, the total air delivery provided by the fresh air blower 27 is in the range of 116 to 155 cubic feet per minute (CFM). The air flow which is diverted to the living quarters through the furnace is in the range of 35 to 62 CFM, depending upon the furnace capacity and the condition of the furnace filter, and the air flow diverted to the attic is in the range of 81 to 93 CFM.

The relatively dry outside air which is diverted to the furnace is heated by the furnace, and the capacity of this air to absorb moisture is thereby substantially increased. The heated outside air provides a drying action which controls the condensation on the inside windows of the dwelling.

The outside air which is diverted to the attic pressurizes the attic and reduces migration of moisture to the attic. In one specific embodiment of the invention, the attic cavity was vented with a minimum of 35 square inches of free area at each end of the mobile home.

The fresh air blower 27 is connected to the furnace controls so that the fresh air blower turns on each time the furnace blower 12 turns on. When the fresh air blower and the furnace blower are turned on, the damper blade 58 of the damper assembly 55 swings open to permit the incoming outside air to enter the furnace blower compartment. When the blowers are turned off, the weighted damper blade swings back to its closed position.

The system can be provided with an accessory that can selectively shut off the introduction of fresh air into the living space during the summer when the air conditioning unit in the furnace is on. The accessory can consist of a solenoid or similar device which will provide a stop to the air-sensitive damper blade. The solenoid or similar device will be in parallel connection with the contactor relays of the air conditioning equipment. If the home owner elects to have fresh outside air during the air conditioning mode, a switch can be provided to disengage the electrically operated solenoid to allow the damper blade to open.

The foregoing fresh air device differs from other devices in that it pressurizes both the living quarters and the attic with outside fresh air. Some fresh air devices are at neutral or negative pressure in the living quarters, and some devices evacuate the attic rather than pressurizing the attic. Pressurization of the living quarters tends to inhibit odor generated at exterior surfaces from permeating into the living space. Pressurization of the attic inhibits the upward migration of vapor from the living quarters and dilutes the air in the attic space with relatively dry outside air. The dilution with relatively dry air reduces the moisture level in the attic and tends to prevent condensation of moisture on attic roof surfaces, which can lead to ceiling damage. Furthermore, the fresh outside air is distributed to each room in the living space by the furnace ducts rather than being simply dumped into one localized area.

While in the foregoing specification a detailed description of a specific embodiment of the invention was set forth for the purpose of illustration, it will be understood that many of the details herein given may be varied considerably by those skilled in the art without departing from the spirit and scope of the invention.

I claim:

1. A fresh air device for a dwelling equipped with a furnace having an air blower for supplying heated air to the dwelling, the dwelling having an attic, the fresh air device comprising:
   a fresh air blower for drawing outside air into the dwelling,
   air dividing means for diverting a first portion of the outside air to the attic and a second portion of the outside air to the furnace, and
   duct means for conveying the second portion of the outside air to the furnace.

2. The device of claim 1 in which the dwelling includes a roof over the attic, the fresh air blower being mounted above the roof and being protected by a fresh air duct surrounding the blower and a cover which is attached to the fresh air duct.

3. The device of claim 2 in which the air dividing means is positioned within the attic below the fresh air blower.

4. The device of claim 2 in which the air dividing means comprises an air box connected to the fresh air duct below the roof, the air box including a partition for dividing the outside air into said first and second portions and having an opening for permitting said first portion of outside air to flow into the attic, said duct means being connected to the air box.

5. The device of claim 1 in which the air dividing means comprises an air box communicating with said fresh air blower, the air box including a partition for dividing the outside air into said first and second portions and having an opening for permitting said first portion of outside air to flow into the attic, said duct means being connected to the air box.

6. The device of claim 1 in which the duct means includes a damper for closing the duct means when the air blower of the furnace is not on.

7. The device of claim 1 including means for energizing the fresh air blower only when the air blower of the furnace is on.

8. The device of claim 1 in which the dwelling is a mobile home.

9. The device of claim 1 in which said first portion of the outside air is about 60 to 70% of the outside air and the second portion of the outside air is about 30 to 40% of the outside air.

10. The device of claim 1 in which the fresh air blower draws about 116 to 155 cubic feet per minute of outside air into the dwelling, the flow of said first portion of outside air being about 81 to 93 cubic feet per minute and the flow of said second portion of outside air being about 35 to 62 cubic feet per minute.

11. The device of claim 1 in which the fresh air blower is a centrifugal air blower.

12. The device of claim 4 in which the fresh air blower is a centrifugal air blower.

13. The device of claim 5 in which said partition provides an air path from said fresh air duct to said duct means which is closed from said opening in the air box.

14. A fresh air device for a dwelling equipped with a furnace having an air blower for supplying heated air to the dwelling, the dwelling having an attic and a roof above the attic, the fresh air device comprising:
   a fresh air duct communicating with the outside of the dwelling,
   a fresh air blower for drawing outside air into the fresh air duct, an air box communicating with the fresh air blower and the fresh air duct, the air box including a partition for dividing the outside air which flows through the fresh air duct into a first portion and a second portion, the air box having a first opening for allowing the first portion of outside air to flow from the air box to the attic and a second opening for allowing the second portion of outside air to flow from the air box, and duct means connected to the second opening of the air box for conveying the second portion of outside air to the furnace.

15. The device of claim 14 in which the duct means includes a damper for closing the duct means when the air blower of the furnace is not on.

16. The device of claim 14 in which the dwelling is a mobile home.

17. The device of claim 14 in which said first portion of the outside air is about 60 to 70% of the outside air and the second portion of the outside air is about 30 to 40% of the outside air.

18. The device of claim 14 in which the fresh air blower draws about 116 to 155 cubic feet per minute of outside air into the dwelling, the flow of said first portion of outside air being about 81 to 93 cubic feet per minute and the flow of said second portion of outside air being about 35 to 62 cubic feet per minute.

19. The device of claim 11 in which the air box includes a generally U-shaped wall which provides the bottom and two sides of the air box, said first opening of the air box being provided by the open ends of the U-shaped wall, said second opening of the air box being provided in one of the sides of the U-shaped air box, said partition being attached to said one side of the air box.

20. The device of claim 14 in which the fresh air blower is a centrifugal air blower.

21. The device of claim 14 in which said partition provides an air path from said fresh air duct to said second opening of the air box which is closed from said first opening of the air box.

* * * * *